(12) United States Patent
Tomeba et al.

(10) Patent No.: US 11,290,997 B2
(45) Date of Patent: Mar. 29, 2022

(54) BASE STATION APPARATUS, TERMINAL APPARATUS, AND COMMUNICATION METHOD

(71) Applicants: SHARP KABUSHIKI KAISHA, Sakai (JP); FG Innovation Company Limited, New Territories (HK)

(72) Inventors: Hiromichi Tomeba, Sakai (JP); Ryota Yamada, Sakai (JP); Hideo Namba, Sakai (JP); Atsushi Shirakawa, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 32 days.

(21) Appl. No.: 16/956,900

(22) PCT Filed: Nov. 12, 2018

(86) PCT No.: PCT/JP2018/041817
§ 371 (c)(1),
(2) Date: Jun. 22, 2020

(87) PCT Pub. No.: WO2019/130858
PCT Pub. Date: Jul. 4, 2019

(65) Prior Publication Data
US 2020/0322957 A1     Oct. 8, 2020

(30) Foreign Application Priority Data
Dec. 27, 2017   (JP) .............................. JP2017-251430

(51) Int. Cl.
*H04W 72/04*     (2009.01)
*H04L 5/00*      (2006.01)

(52) U.S. Cl.
CPC .......... *H04W 72/042* (2013.01); *H04L 5/001* (2013.01); *H04L 5/0098* (2013.01);
(Continued)

(58) Field of Classification Search
CPC .......... H04W 72/042; H04W 72/0453; H04W 72/046; H04L 5/001; H04L 5/0098
See application file for complete search history.

(56) References Cited

U.S. PATENT DOCUMENTS

| 11,129,070 B2* | 9/2021 | Park .................... H04W 16/28 |
| 2017/0026938 A1* | 1/2017 | Onggosanusi ........ H04L 5/0051 |

(Continued)

OTHER PUBLICATIONS

"IMT Vision—Framework and overall objectives of the future development of IMT for 2020 and beyond", Recommendation ITU-R M.2083-0, Sep. 2015.
(Continued)

*Primary Examiner* — Kevin C. Harper
(74) *Attorney, Agent, or Firm* — ScienBiziP, P.C.

(57) ABSTRACT

A base station apparatus according to the present invention includes a transmitter configured to transmit a downlink signal by using a first component carrier and a second component carrier, and a receiver configured to receive an uplink signal transmitted by the terminal apparatus by using at least the second component carrier. The transmitter transmits spatial relation information in the uplink signal, the spatial relation information is information indicating a spatial domain transmission filter for transmitting the uplink signal, and the spatial relation information in the second component carrier includes information indicating the first component carrier.

6 Claims, 5 Drawing Sheets

(52) U.S. Cl.
CPC ..... *H04W 72/046* (2013.01); *H04W 72/0453* (2013.01); *H04L 5/0048* (2013.01)

(56) References Cited

U.S. PATENT DOCUMENTS

| | | | |
|---|---|---|---|
| 2018/0359790 A1* | 12/2018 | Ingale | H04W 28/16 |
| 2019/0045491 A1* | 2/2019 | Zhang | H04W 72/1289 |
| 2021/0051502 A1* | 2/2021 | Yamada | H04L 5/0053 |
| 2021/0176789 A1* | 6/2021 | Takahashi | H04W 74/0833 |

OTHER PUBLICATIONS

E. G. Larsson et al., "Massive MIMO for next generation wireless systems", IEEE Commun. Mag., vol. 52, No. 2, pp. 186-195, 2014.
Qualcomm, "Summary of Beam Mgmt", 3GPP TSG RAN WG1 Meeting #91, R1-1721696, Dec. 1, 2017.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

This application claims priority based on JP 2017-251430 filed on Dec. 27, 2017, the contents of which are incorporated herein by reference.

BACKGROUND ART

Research and development activities related to the 5th generation mobile radio communication system (5G system) have been actively carried out, aiming to start commercial services around the year 2020. A vision recommendation on the standard system of the 5G system (International mobile telecommunication—2020 and beyond: IMT-2020) was recently reported (see NPL 1) by the International Telecommunication Union Radio communications Sector (ITU-R), which is an international standardization body.

Providing sufficient frequency resources is an important issue for a communication system to handle a rapid increase in data traffic. Thus, one of the targets for 5G is to achieve ultra large-capacity communication using frequency bands higher than the frequency bands used in Long term evolution (LTE).

However, in radio communication using high frequency bands, path loss is a problem. Beamforming based on multiple antennas is a promising technique for compensation for the path loss, (see NPL 2). The provision of multiple antennas (antenna panels) each configured with independent beamforming are also under study to compensate for the path loss by appropriately switch the multiple antennas.

There is anticipation for the utilization of duality of the channel performance on the downlink (base station apparatus to terminal apparatus) and the uplink (terminal apparatus to base station apparatus). For example, by using beamforming used for downlink signal reception to perform uplink signal transmission, the terminal apparatus can efficiently compensate for path loss based on beamforming.

Achieving high speed transmission also requires expansion of the frequency bandwidth. In LTE, carrier aggregation in which multiple component carriers are bundled together for communication has been used to achieve broadband and increase transmission speed, and also in 5G, there are expectations for the utilization of carrier aggregation.

CITATION LIST

Non Patent Literature

NPL 1: "IMT Vision—Framework and overall objectives of the future development of IMT for 2020 and beyond", Recommendation ITU-R M. 2083-0, September 2015.

NPL 2: E. G. Larsson, O. Edfors, F. Tufvesson, and T. L. Marzetta, "Massive MIMO for next generation wireless system", IEEE Commun. Mag., vol. 52, no. 2, pp. 186-195, February 2014.

SUMMARY OF INVENTION

Technical Problem

However, in 5G, the carrier components bundled by carrier aggregation are expected to be wide-ranging. The control of the terminal apparatus performed by the base station apparatus is based on control for each component carrier. However, the base station apparatus needs to configure, for the terminal apparatus, various items including beamforming, and an increase in overhead is also a problem in implementation of carrier aggregation.

An aspect of the present invention has been made in view of such circumstances, and an object of the present invention is to provide a base station apparatus, a terminal apparatus, and a communication method that can suppress an increase in overhead, while realizing efficient beamforming, stabilizing communication quality, and thus improving frequency efficiency or throughput, in order to achieve broadband transmission in which multiple component carriers are bundled.

Solution to Problem

To address the above-mentioned drawbacks, a base station apparatus, a terminal apparatus, and a communication method according to an aspect of the present invention are configured as follows.

(1) Specifically, a base station apparatus according to an aspect of the present invention is a base station apparatus for communicating with a terminal apparatus, the base station apparatus including a transmitter configured to transmit a downlink signal by using a first component carrier and a second component carrier, and a receiver configured to receive an uplink signal transmitted by the terminal apparatus by using at least the second component carrier, wherein the transmitter transmits spatial relation information in the uplink signal, the spatial relation information is information indicating a spatial domain transmission filter for transmitting the uplink signal, and the spatial relation information in the second component carrier includes information indicating the first component carrier.

(2) According to an aspect of the present invention, in the base station apparatus described above in (1), the spatial relation information in the second component carrier includes information indicating a synchronization signal or a channel state information reference signal or a sounding reference signal transmitted on the first component carrier.

(3) According to an aspect of the present invention, in the base station apparatus described above in (2), the uplink signal is a sounding reference signal transmitted on the second component carrier.

(4) According to an aspect of the present invention, in the base station apparatus described above in (2), the uplink signal is an uplink control signal transmitted on the second component carrier.

(5) According to an aspect of the present invention, in the base station apparatus described above in (1), the spatial relation information in the second component carrier is associated with a first slot configuration indicating a slot configuration of the first component carrier and a second slot configuration indicating a slot configuration of the second component carrier.

(6) According to an aspect of the present invention, in the base station apparatus described above in (5), in a case that the first slot configuration is different from the second slot configuration, the spatial relation information in the second component carrier includes a prescribed signal transmitted on the first component carrier.

(7) A terminal apparatus according to an aspect of the present invention is a terminal apparatus for communicating with a base station apparatus, the terminal apparatus including a receiver configured to receive a downlink signal by using a first component carrier and a second component carrier, and a transmitter configured to transmit an uplink signal by using the first component carrier and the second component carrier, wherein the receiver receives spatial relation information associated with the uplink signal in the second component carrier, the spatial relation information includes information indicating the first component carrier, and based on the spatial relation information, the transmitter uses a spatial domain reception filter configured by the receiver in receiving a prescribed signal included in the first component carrier, to configure a spatial domain transmission filter configured for the uplink signal transmitted on the second component carrier.

(8) A communication method according to an aspect of the present invention is a communication method for a base station apparatus for communicating with a terminal apparatus, the method including the steps of transmitting a downlink signal by using a first component carrier and a second component carrier, receiving an uplink signal transmitted by the terminal apparatus by using at least the second component carrier, and transmitting spatial relation information in the uplink signal, wherein the spatial relation information is information indicating a spatial domain transmission filter for transmitting the uplink signal, and the spatial relation information in the second component carrier includes information indicating the first component carrier.

Advantageous Effects of Invention

According to an aspect of the present invention, with an increase in overhead suppressed, efficient beamforming can be achieved, communication quality can be stabilized, and frequency efficiency or throughput can be improved.

DESCRIPTION OF EMBODIMENTS

A communication system according to the present embodiment includes a base station apparatus (a transmitter, cells, a transmission point, a group of transmit antennas, a group of transmit antenna ports, a component carrier, an eNodeB, a transmission point, a transmission and/or reception point, a transmission panel, and an access point) and a terminal apparatus (a terminal, a mobile terminal, a reception point, a reception terminal, a receiver, a group of receive antennas, a group of receive antenna ports, UE, a reception point, a reception panel, and a station). Furthermore, a base station apparatus connected to a terminal apparatus (base station apparatus that establishes a radio link with a terminal apparatus) is referred to as a serving cell.

The base station apparatus and the terminal apparatus in the present embodiment can communicate in a licensed band and/or an unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

Figure 1:
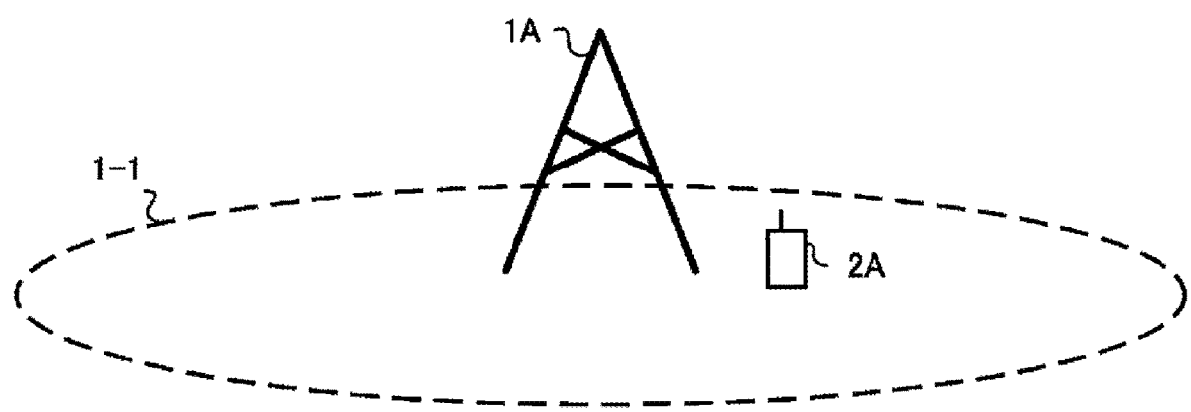
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. Coverage 1-1 is a range (a communication area) in which the base station apparatus 1A can connect to the terminal apparatuses. The base station apparatus 1A is also simply referred to as a base station apparatus. The terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

PUCCH is used to transmit Uplink Control Information (UCI). The Uplink Control Information includes a positive acknowledgement (ACK) or a negative acknowledgement (NACK) (ACK/NACK) for downlink data (a downlink transport block or a Downlink-Shared Channel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) for specifying a suited spatial multiplexing number, a Precoding Matrix Indicator (PMI) for specifying a suited precoder, a Channel Quality Indicator (CQI) for specifying a suited transmission rate, a Channel State Information Reference Signal (RS) (CSI-RS) Resource Indicator CRI (CSI-RS Resource Indicator) for specifying a suited CSI-RS resource, and the like.

The Channel Quality Indicator (hereinafter, referred to as a CQI value) can be a preferable modulation scheme (e.g., QPSK, 16QAM, 64QAM, 256QAM, or the like) and a preferable coding rate in a prescribed band (details of which will be described later). The CQI value can be an index (CQI Index) determined by the above change scheme, coding rate, and the like. The CQI value can take a value predetermined in the system.

The CRI indicates a CSI-RS resource for which received power/reception quality from multiple CSI-RS resources is preferable.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that some or all of the CQI values, the PMI values, the RI values, and the CRI values are also collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the uplink control information only.

PUSCH is used to transmit an RRC message. The RRC message is a signal/information that is processed in a Radio Resource Control (RRC) layer. Further, PUSCH is used to transmit a MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. Here, uplink reference signals include a Demodulation Reference Signal (DMRS), a Sounding Reference Signal (SRS), and a Phase-Tracking reference signal (PT-RS).

The DMRS is associated with transmission of the PUSCH or the PUCCH. For example, the base station apparatus 1A uses DMRS in order to perform channel compensation of PUSCH or PUCCH. For example, the base station apparatus 1A uses SRS to measure an uplink channel state. The SRS is used for observation (sounding) of the uplink. PT-RS is used to compensate for phase noise. Note that an uplink DMRS is also referred to as an uplink DMRS.

In FIG. 1, the following downlink physical channels are used for the downlink radio communication from the base station apparatus 1A to the terminal apparatus 2A. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

PBCH is used for broadcasting a Master Information Block (MIB, a Broadcast Channel (BCH)) that is used commonly by the terminal apparatuses. PCFICH is used for transmission of information for indicating a region (e.g., the number of Orthogonal Frequency Division Multiplexing (OFDM) symbols) to be used for transmission of PDCCH. Note that the MIB is also referred to as minimum system information.

PHICH is used for transmission of ACK/NACK with respect to uplink data (a transport block, a codeword) received by the base station apparatus 1A. In other words, PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and DTX for indicating that no corresponding data is present. In a case that PHICH for uplink data is not present, the terminal apparatus 2A reports ACK to a higher layer.

PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

The DCI format for the uplink can be used to request Channel State Information (CSI, also referred to as reception quality information) for the downlink (CSI request).

The DCI format for the uplink can be used for a configuration for indicating an uplink resource to which a Channel State Information report (CSI feedback report) is mapped, the Channel State Information report being fed back to the base station apparatus by the terminal apparatus. For example, the Channel State Information report can be used for a configuration for indicating an uplink resource that periodically reports Channel State Information (Periodic CSI). The Channel State Information report can be used for a mode configuration (CSI report mode) for periodically reporting the Channel State Information.

For example, the Channel State Information report can be used for a configuration for indicating an uplink resource that reports aperiodic Channel State Information (Aperiodic CSI). The Channel State Information report can be used for a mode configuration (CSI report mode) for aperiodically reporting the Channel State Information.

For example, the Channel State Information report can be used for a configuration for indicating an uplink resource that reports semi-persistent CSI. The Channel State Information report can be used for a mode configuration (CSI report mode) for semi-persistently reporting the Channel State Information.

The DCI format for the uplink can be used for a configuration for indicating a type of the Channel State Information report that is fed back to the base station apparatus by the terminal apparatus. The type of the Channel State Information report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information on the scheduled PUSCH.

PDSCH is used to transmit the downlink data (the downlink transport block, DL-SCH). PDSCH is used to transmit a system information block type 1 message. The system information block type 1 message is cell-specific information.

PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. The RRC message transmitted from the base station apparatus 1A may be a dedicated message to a given terminal apparatus 2A (also referred to as dedicated signaling). In other words, user equipment-specific (user equipment-unique) information is transmitted by using the message dedicated to the certain terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a Channel State Information report (CSI feedback report) is mapped, the Channel State Information report being fed back to the base station apparatus by the terminal apparatus. For example, the Channel State Information report can be used for a configuration for indicating an uplink resource that periodically reports Channel State Information (Periodic CSI). The Channel State Information report can be used for a mode configuration (CSI report mode) for periodically reporting the Channel State Information.

The type of the downlink Channel State Information report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer. Note that the synchronization signals include a Primary Synchronization Signal (PSS) and a Secondary Synchronization Signal (SSS).

The synchronization signal is used for the terminal apparatus to take synchronization in the frequency domain and the time domain in the downlink. The synchronization signal is also used to measure received power, reception quality, or a Signal-to-Interference and Noise power Ratio (SINR). Note that the received power measured by the synchronization signal is referred to as Synchronization Signal-Reference Signal Received Power (SS-RSRP) and that the reception quality measured by the synchronization signal is referred to as Reference Signal Received Quality (SS-RSRQ) and that the SINR measured by the synchronization signal is also referred to as SS-SINR. Note that SS-RSRQ is the ratio between SS-RSRP and RSSI. The Received Signal Strength Indicator (RSSI) is the total average received power during a certain observation period. The synchronization signal/downlink reference signal is used for the terminal apparatus to perform channel compensation for a downlink physical channel. For example, the synchronization signal/downlink reference signal is used for the terminal apparatus to calculate the downlink Channel State Information.

Here, the downlink reference signals include a Cell-specific Reference Signal (CRS), a Demodulation Reference Signal (DMRS), a Non-Zero Power Chanel State Information-Reference Signal (NZP CSI-RS), a Zero Power Chanel State Information-Reference Signal (ZP CSI-RS), PT-RS, and a Tracking Reference Signal (TRS). Note that DMRS in the downlink is also referred to as a downlink DMRS. Note that in the following embodiments, a simple reference to CSI-RS includes NZP CSI-RS and/or ZP CSI-RS.

CRS is transmitted in an entire band of a subframe and is used to perform demodulation of PBCH/PDCCH/PHICH/PCFICH/PDSCH. DMRS is transmitted in a subframe or a band used to transmit PDSCH/PBCH/PDCCH/EPDCCH to which DMRS is related, and is used to demodulate PDSCH/PBCH/PDCCH/EPDCCH with which DMRS is associated.

A resource for NZP CSI-RS is configured by the base station apparatus 1A. For example, the terminal apparatus 2A performs signal measurement (channel measurement) by using NZP CSI-RS. NZP CSI-RS is also used, for example, for beam scanning in which a preferable beam direction is searched for and beam recovery in which degraded received power/reception quality in the beam direction is recovered. A resource for ZP CSI-RS is configured by the base station apparatus 1A. With zero output, the base station apparatus 1A transmits ZP CSI-RS. For example, the terminal apparatus 2A performs interference measurement in a resource to which ZP CSI-RS corresponds.

CSI-RS is also used to measure the received power, reception quality, or SINR. The received power measured by CSI-RS is also referred to as CSI-RSRP, the reception quality measured by CSI-RS is also referred to as CSI-RSRQ, and SINR measured by CSI-RS is also referred to as CSI-SINR. Note that CSI-RSRQ is a ratio between CSI-RSRP and RSSI.

A Multimedia Broadcast multicast service Single Frequency Network (MBSFN) RS is transmitted in an entire band of the subframe used for transmitting PMCH. MBSFN RS is used to demodulate PMCH. PMCH is transmitted through the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Furthermore, for terminal apparatuses that supports Carrier Aggregation (CA), the base station apparatus can integrate multiple Component Carriers (CCs) for transmission in a broader band to perform communication. In carrier aggregation, one Primary Cell (PCell) and one or more Secondary Cells (SCells) are configured as a set of serving cells.

Furthermore, in Dual Connectivity (DC), a Master Cell Group (MCG) and a Secondary Cell Group (SCG) are configured as a group of serving cells. MCG includes a PCell and optionally one or more SCells. Furthermore, SCG includes a primary SCell (PSCell) and optionally one or more SCells.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

The slot includes 14 OFDM symbols. Since the OFDM symbol length can vary depending on the subcarrier spacing, the slot length may also vary depending on the subcarrier spacing. The mini-slot includes fewer OFDM symbols than the slot. The slot/mini-slot can be used as a scheduling unit. Note that the terminal apparatus can recognize slot-based scheduling/mini-slot-based scheduling from the position (allocation) of the first downlink DMRS. In the slot-based scheduling, the first downlink DMRS is allocated to the third or fourth symbol in the slot. In the mini-slot-based scheduling, the first downlink DMRS is allocated to the first symbol in the scheduled data (resource, PDSCH).

The resource block is defined by 12 continuous subcarriers. The resource element is defined by an index in the frequency domain (e.g., a subcarrier index) and an index in the time domain (e.g., OFDM symbol index). The resource element is classified as an uplink resource element, a downlink resource element, a flexible resource element, or a reserved resource element. In the reserved resource element, the terminal apparatus does not transmit uplink signals or not receive downlink signals.

Multiple Subcarrier spacings (SCS) are supported. For example, the SCS is 15/30/60/120/240/480 kHz.

The base station apparatus/terminal apparatus can communicate in a licensed band or an unlicensed band. For the base station apparatus/terminal apparatus, the licensed band is used for a PCell, and communication with at least one SCell operating in the unlicensed band can be performed through carrier aggregation. The base station apparatus/terminal apparatus can communicate through dual connectivity in which a master cell group communicates in the licensed band and a secondary cell group communicates in the unlicensed band. The base station apparatus/terminal apparatus can communicate in the unlicensed band by using only the PCell. The base station apparatus/terminal apparatus can communicate through CA or DC only in the unlicensed band. Note that communication performed with the licensed band being used as a PCell and with a cell in the unlicensed band (SCell or PSCell) being assisted by, for example, CA or DC is also referred to as Licensed-Assisted Access (LAA). Communication performed by the base station apparatus/terminal apparatus only in the unlicensed band is also referred to as Unlicensed-standalone access (ULSA). Communication performed by the base station apparatus/terminal apparatus only in the licensed band is also referred to as Licensed Access (LA).

Figure 2:
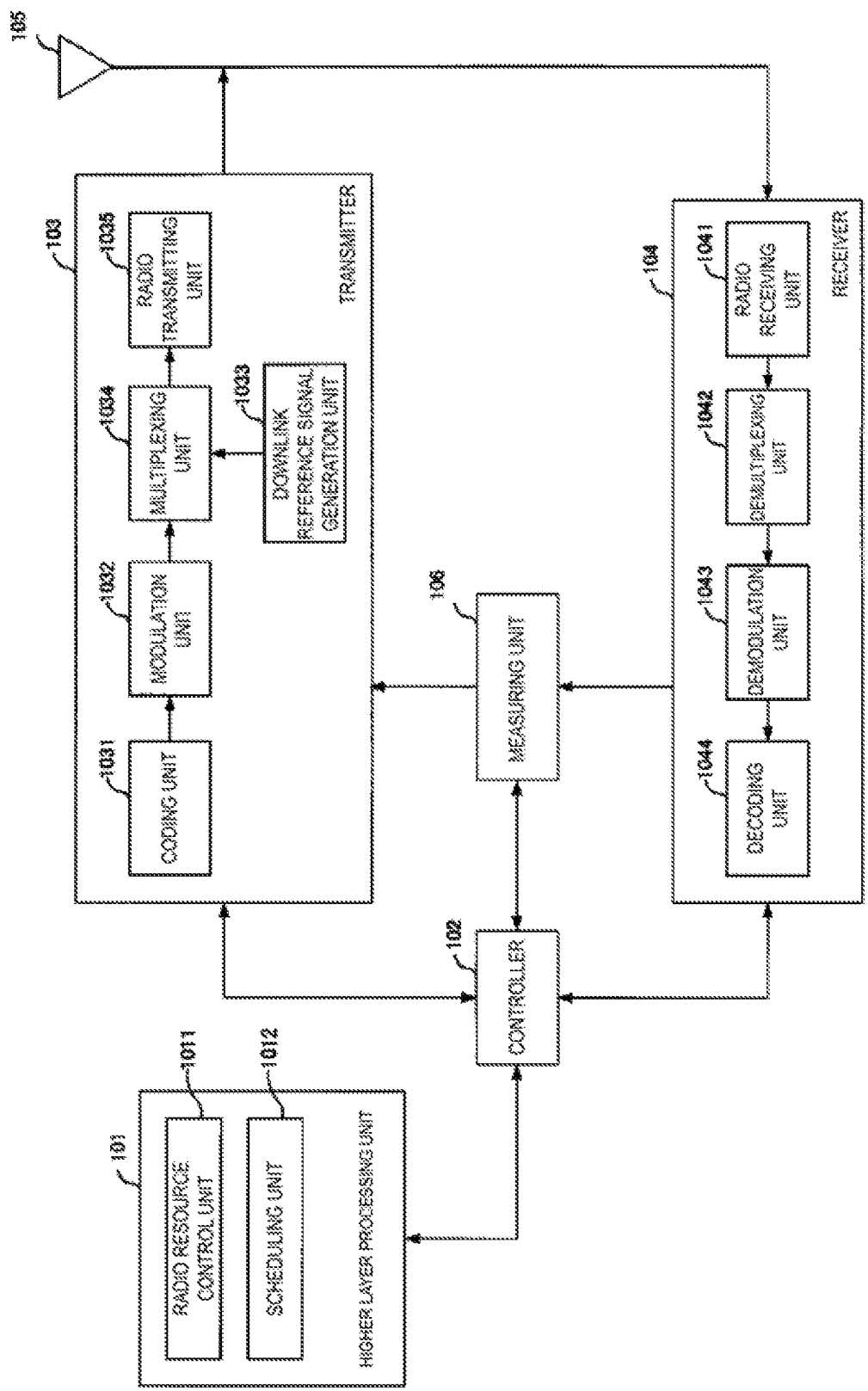
FIG. 2 is a block diagram illustrating a configuration example of a base station apparatus according to the present embodiment.

FIG. 2 is a schematic block diagram illustrating a configuration of the base station apparatus according to the present embodiment. As illustrated in FIG. 2, the base station apparatus includes a higher layer processing unit (higher layer processing step) 101, a controller (controlling step) 102, a transmitter (transmitting step) 103, a receiver (receiving step) 104, a transmit and/or receive antenna 105, and a measuring unit (measuring step) 106. The higher layer processing unit 101 includes a radio resource control unit (radio resource controlling step) 1011 and a scheduling unit (scheduling step) 1012. The transmitter 103 includes a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 includes a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the terminal apparatus transmits information (parameters) for indicating whether the prescribed function is supported. In a case where a terminal apparatus does not support a prescribed function, the terminal apparatus does not transmit information (parameters) for indicating whether the prescribed function is supported. In other words, whether the predetermined function is supported is notified by whether information (parameters) for indicating whether the predetermined function is supported is transmitted. The information (parameters) for indicating whether the predetermined function is supported may be notified by using one bit of 1 or 0.

The radio resource control unit 1011 generates, or acquires from a higher node, the downlink data (the transport block) allocated in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2A through the transmit and/or receive antenna 105.

The coding unit 1031 codes the HARQ indicator, the downlink control information, and the downlink data that are input from the higher layer processing unit 101, in compliance with a prescribed coding scheme, such as block coding, convolutional coding, and turbo coding, Low density parity check coding (LDPC), or Polar coding, or in compliance with a coding scheme determined by the radio resource control unit 1011. The modulation unit 1032 modulates the coded bits input from the coding unit 1031, in compliance with the modulation scheme prescribed in advance, such as Binary Phase Shift Keying (BPSK), quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like to generate an OFDM symbol, adds a cyclic prefix (CP) to the generated OFDM symbol to generate a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) of the signal from which the CP has been removed, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and uplink reference signal. The demultiplexing is performed based on radio resource allocation information, included in the uplink grant predetermined by the base station apparatus 1A by using the radio resource control unit 1011 and notified to each of the terminal apparatuses 2A.

Furthermore, the demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, obtains modulation symbols, and demodulates, for each of the modulation symbols of PUCCH and PUSCH, a reception signal in compliance with a prescribed modulation scheme, such as BPSK, QPSK, 16QAM, 64QAM, and 256QAM, or in compliance with a modulation scheme that the base station apparatus 1A notified to each of the terminal apparatuses 2A in advance by using the uplink grant.

The decoding unit 1044 decodes the coded bits of PUCCH and PUSCH that have been demodulated, at a coding rate, in compliance with a prescribed coding scheme, that is prescribed or notified from the base station apparatus 1A to the terminal apparatus 2A in advance by using the uplink grant, and outputs the decoded uplink data and uplink control information to the higher layer processing unit 101. In a case where PUSCH is retransmitted, the decoding unit 1044 performs the decoding by using the coded bits that is input from the higher layer processing unit 101 and retained in an HARQ buffer, and the demodulated coded bits.

The measuring unit 106 observes the received signal, and determines various measurement values such as RSRP/RSRQ/RSSI. The measuring unit 106 determines received power, reception quality, and a preferable SRS resource index from the SRS transmitted from the terminal apparatus.

Figure 3:
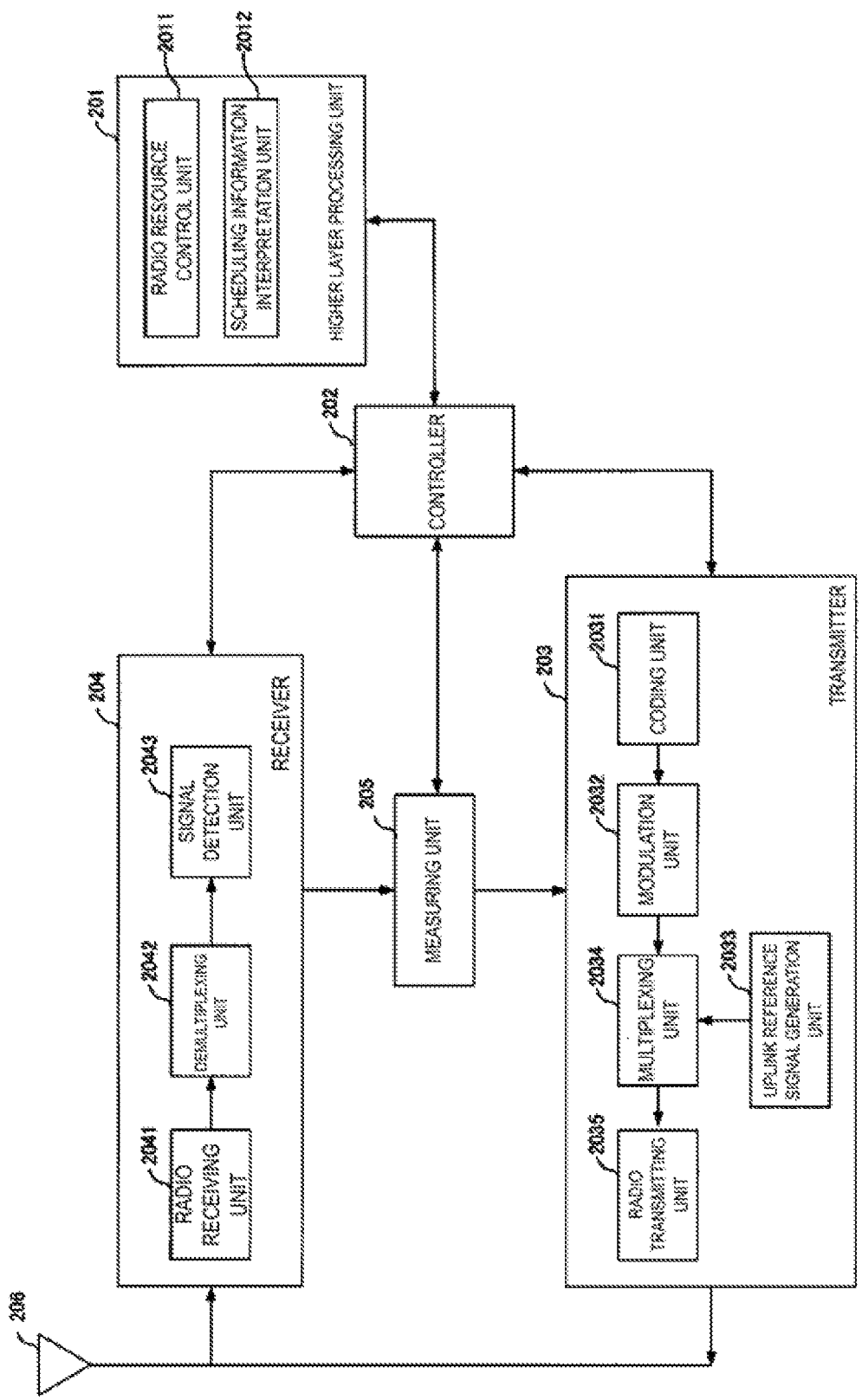
FIG. 3 is a block diagram illustrating a configuration example of a terminal apparatus according to the present embodiment.

FIG. 3 is a schematic block diagram illustrating a configuration of the terminal apparatus according to the present embodiment. As illustrated in FIG. 3, the terminal apparatus includes a higher layer processing unit (higher layer processing step) 201, a controller (controlling step) 202, a transmitter (transmitting step) 203, a receiver (receiving step) 204, a measuring unit (measuring step) 205, and a transmit and/or receive antenna 206. The higher layer processing unit 201 includes a radio resource control unit (radio resource controlling stop) 2011 and a scheduling information interpretation unit (scheduling information interpreting step) 2012. The transmitter 203 includes a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 includes a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus 2A.

Furthermore, the radio resource control unit 2011 manages various configuration information of the terminal apparatuses 2A. Furthermore, the radio resource control unit 2011 generates information to be mapped to each uplink channel, and outputs the generated information to the transmitter 203.

The radio resource control unit 2011 acquires configuration information transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

Based on the information input from the higher layer processing unit 201, the controller 202 generates a control signal for controlling the receiver 204, the measuring unit 205, and the transmitter 203. The controller 202 outputs the generated control signal to the receiver 204, the measuring unit 205, and the transmitter 203 to control the receiver 204 and the transmitter 203.

The controller 202 controls the transmitter 203 to transmit CSI/RSRP/RSRQ/RSSI generated by the measuring unit 205 to the base station apparatus.

In accordance with the control signal input from the controller 202, the receiver 204 demultiplexes, demodulates, and decodes a reception signal received from the base station apparatus through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain.

The demultiplexing unit 2042 demultiplexes the extracted signal into PHICH, PDCCH, EPDCCH, PDSCH, and the downlink reference signal. Furthermore, the demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043, by using PDSCH and the channel estimation value, detects a signal, and outputs the detected signal to the higher layer processing unit 201.

The measuring unit 205 performs various measurements such as CSI measurement, Radio Resource Management (RRM) measurement, Radio Link Monitoring (RLM) measurement, and the like, and determines CSI/RSRP/RSRQ/RSSI.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus through the transmit and/or receive antenna 206.

The coding unit 2031 codes the uplink control information or uplink data input from the higher layer processing unit 201 in compliance with a coding scheme such as convolutional coding, block coding, turbo coding, LDPC coding, or Polar coding.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence determined according to a prescribed rule (formula), based on a physical cell identity (also referred to as a Physical Cell Identity (PCI), a cell ID, or the like) for identifying the base station apparatus, a bandwidth in which the uplink reference signal is allocated, a cyclic shift notified with the uplink grant, a parameter value for generation of a DMRS sequence, and the like.

The multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmitting unit 2035 performs Inverse Fast Fourier Transform (IFFT) on a signal resulting from the multiplexing, performs the modulation of OFDM scheme to generate an OFDMA symbol, adds CP to the generated OFDMA symbol to generate a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

Note that the terminal apparatus can perform modulation according to not only the OFDMA scheme but also the SC-FDMA scheme.

In a case that ultra large-capacity communication is required, such as ultra high-definition video transmission, ultra wide band transmission utilizing high frequency bands is desired. Transmission in high frequency bands needs to compensate for path loss, and beamforming is important. In an environment in which multiple terminal apparatuses exist in a limited area, in a case that ultra large-capacity communication is required for each terminal apparatus, an Ultra-dense network is effective in which base station apparatuses are deployed at high density. However, in a case that the base station apparatuses are deployed at high density, the Signal to noise power ratio (SNR) is greatly improved, although strong interference due to beamforming may occur. Accordingly, realization of ultra large-capacity communication with every terminal apparatus in a limited area requires interference control (avoidance, suppression, and cancellation) in consideration of beamforming and/or coordinated communication among multiple base stations.

Figure 4:
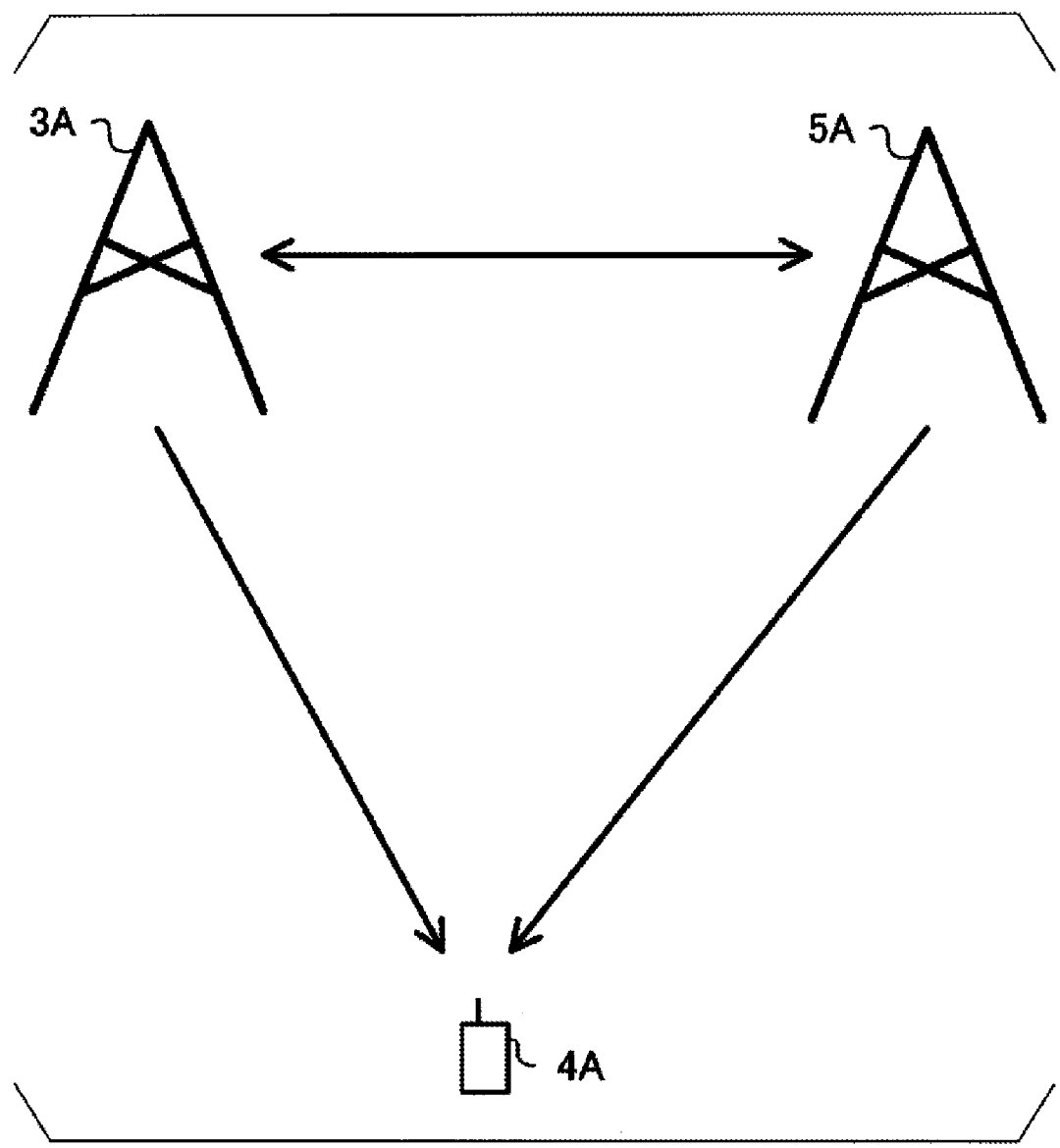
FIG. 4 is a diagram illustrating an example of a communication system according to the present embodiment.

FIG. 4 is a diagram illustrating an example of a downlink communication system according to the present embodiment. The communication system illustrated in FIG. 4 includes a base station apparatus 3A, a base station apparatus 5A, and a terminal apparatus 4A. The terminal apparatus 4A can use the base station apparatus 3A and/or the base station apparatus 5A as a serving cell. In a case that the base station apparatus 3A or the base station apparatus 5A includes a large number of antennas, the multiple antennas can be divided into multiple subarrays (panels or sub-panels), and transmit/receive beamforming can be applied to the respective subarrays. In this case, each subarray may include a communication apparatus, and the configuration of the communication apparatus is similar to the base station apparatus configuration illustrated in FIG. 2, unless otherwise indicated. In a case that the terminal apparatus 4A includes multiple antennas, the terminal apparatus 4A can perform transmission or reception through beamforming. In a case that the terminal apparatus 4A includes multiple antennas, multiple antennas can be divided into multiple subarrays (panels or sub-panels), and transmit/receive beamforming can be applied to the respective subarrays. Each subarray can include a communication apparatus, and the configuration of the communication apparatus is similar to the terminal apparatus configuration illustrated in FIG. 3, unless otherwise indicated. Note that the base station apparatus 3A and the base station apparatus 5A are also simply referred to as the base station apparatuses. Note that the terminal apparatus 4A is also simply referred to as the terminal apparatus.

The synchronization signal is used to determine a preferable transmit beam for the base station apparatus and a preferable receive beam for the terminal apparatus. The base station apparatus transmits synchronization signal blocks including PSS, PBCH, and SSS. Note that, in the synchronization signal block burst set period configured by the base station apparatus, one or multiple synchronization signal blocks are transmitted in the time domain, and a time index is configured for each synchronization signal block. The terminal apparatus may consider that synchronization signal blocks with the same time index within a synchronization signal block burst set period have been transmitted from a somewhat quasi co-located (QCL) and can thus be considered to have the same delay spread, a Doppler spread, a Doppler shift, an average gain, an average delay, spatial reception parameters and/or spatial transmission parameters. Note that the spatial reception parameters include, for example, a spatial correlation between channels and an Angle of Arrival. The spatial transmission parameters include, for example, a spatial correlation between channels and an Angle of Departure. That is, the terminal apparatus can assume that synchronization signal blocks with the same time index within the synchronization signal block burst set period have been transmitted in the same transmit beam and that synchronization signal blocks with different time indexes have been transmitted in different beams. Accordingly, in a case that the terminal apparatus reports, to the base station apparatus, information indicating the time index of a preferable synchronization signal block in the synchronization signal block burst set period, the base station apparatus can recognize a transmit beam preferable for the terminal apparatus. The terminal apparatus can determine a preferable receive beam for the terminal apparatus by using synchronization signal blocks with the same time index in different synchronization signal block burst set periods.

Thus, the terminal apparatus can associate the time index of the synchronization signal block with a receive beam direction and/or the subarray. Note that, in a case of including multiple subarrays, the terminal apparatus may use a different subarray to connect to a different cell.

The CSI-RS can be used to determine a preferable transmit beam for the base station apparatus and a preferable receive beam for the terminal apparatus. The base station apparatus can configure configuration information through higher layer signalling. For example, the configuration information includes a part or all of a resource configuration and a report configuration.

The resource configuration includes a resource configuration ID, a resource configuration type, and/or one or multiple CSI-RS resource set configurations. The resource configuration ID is used to identify the resource configuration. The resource configuration type indicates the operation of the resource configuration in the time domain. Specifically, the resource configuration type indicates whether the resource configuration corresponds to aperiodic transmission of the CSI-RS, periodic transmission of the CSI-RS, or semi-persistent transmission of the CSI-RS. The CSI-RS resource set configuration includes a CSI-RS resource set configuration ID and/or one or multiple CSI-RS resource configurations. The CSI-RS resource set configuration ID is used to specify the CSI-RS resource set configuration. The CSI-RS resource configuration includes some or all of a CSI-RS resource configuration ID, a resource configuration type, the number of antenna ports, CSI-RS resource mapping, and power offset between CSI-RS and PDSCH. The CSI-RS resource configuration ID is used to specify the CSI-RS resource configuration, and the CSI-RS resource ID allows association of the CSI-RS resource. The CSI-RS resource mapping indicates a resource element (OFDM symbol or subcarrier) on which the CSI-RS in the slot is allocated.

The resource configuration is used for CSI measurement or RRM measurement. The terminal apparatus receives the CSI-RS by using the configured resource, calculates CSI from the CSI-RS, and reports the CSI to the base station apparatus. In a case that the CSI-RS resource set configuration includes multiple CSI-RS resource configurations, the terminal apparatus uses each CSI-RS resource to receive the CSI-RS in the same receive beam, and calculates CRI. For example, in a case that the CSI-RS resource set configuration includes K (where K is an integer of 2 or greater) CSI-RS resource configurations, the CRI indicates preferable N CSI-RS resources included in K CSI-RS resources. In this case, N is a positive integer smaller than K. In a case that the CRI indicates multiple CSI-RS resources, the terminal apparatus can report CSI-RSRP measured in each CSI-RS resource to the base station apparatus to indicate which CSI-RS resource has high quality. By beamforming (precoding) CSI-RS in different beam directions on the multiple CSI-RS resources configured, the base station apparatus can recognize the transmit beam direction of the base station apparatus preferable for the terminal apparatus from the CRI reported from the terminal apparatus. On the other hand, a preferable receive beam direction of the terminal apparatus can be determined using a CSI-RS resource to which the transmit beam for the base station apparatus is fixed. For example, the base station apparatus transmits information indicating whether the transmit beam for the base station apparatus is fixed to a certain CSI-RS resource and/or a period of time during which the transmit beam is fixed to the CSI-RS resource. In the CSI-RS resource to which the transmit beam is fixed, the terminal apparatus can determine a preferable receive beam direction from CSI-RS received in different receive beam directions. Note that the terminal apparatus may report CSI-RSRP after determining the preferable receive beam direction. Note that in a case of including multiple subarrays, the terminal apparatus can select a preferable subarray in determining the preferable receive beam direction. Note that the preferable receive beam direction of the terminal apparatus may be associated with CRI. In a case that the terminal apparatus reports multiple pieces of CRI, the base station apparatus can fix the transmit beam to the CSI-RS resource associated with each piece of CRI. At this time, the terminal apparatus can determine the preferable receive beam direction for each piece of CRI. For example, the base station apparatus may associate a downlink signal/channel with the CRI for transmission. At this time, the terminal apparatus needs to use, for reception, a receive beam associated with the CRI. In the multiple CSI-RS resources configured, different base station apparatuses can transmit CSI-RSs. In this case, the network side can recognize, from the CRI, which base station apparatus provides high communication quality. In a case of including multiple subarrays, the terminal apparatus can perform reception at the multiple subarrays at the same timing. Accordingly, in a case that the base station apparatus uses downlink control information or the like to associate each of multiple layers (codewords or transport blocks) with the CRI for transmission, the terminal apparatus can receive multiple layers by using the subarray and receive beam corresponding to each piece of CRI. However, in a case that an analog beam is used and that one receive beam direction is used at one subarray at the same timing, the terminal apparatus may fail to receive multiple receive beams in a case that two pieces of CRI corresponding to one subarray of the terminal apparatus are simultaneously configured. To avoid this problem, for example, the base station apparatus groups the multiple CSI-RS resources configured, and determines the CRI by using the same subarray within the group. By using different subarrays among the groups, the base station apparatus can recognize multiple pieces of CRI that can be configured with the same timing. Note that a group of CSI-RS resources may be a CSI-RS resource set. Note that QCL may be assumed for pieces of CRI that can be configured with the same timing. At this time, the terminal apparatus can transmit the CRI in association with QCL information. For example, in a case that the terminal apparatus distinguishes quasi-co-located CRI from non-quasi-co-located CRI for reporting, the base station apparatus can configure non-quasi-co-located CRI with the same timing without configuring quasi-co-located CRI with the same timing. The base station apparatus may request CSI for each subarray of the terminal apparatus. In this case, the terminal apparatus reports the CSI for each subarray. Note that, in a case of reporting multiple pieces of CRI to the base station apparatus, the terminal apparatus may exclusively report non-quasi-co-located CRI.

The report configuration is a configuration related to CSI reporting, and includes a report configuration ID, a report configuration type, and/or a report value (amount). The report configuration ID is used to identify the report configuration. The report value (amount) is the value for (amount of) CSI reported. The report configuration type is a configuration for aperiodic reporting of the CSI value (amount), a configuration for periodic reporting of the CSI value (amount), or a configuration for semi-persistent reporting of the CSI value (amount).

In order to determine the preferable transmit beam for the base station apparatus, a codebook is used in which candidates for a prescribed precoding (beamforming) matrix (vector) are defined. The base station apparatus transmits CSI-RS, and the terminal apparatus determines a precoding (beamforming) matrix in the codebook to be a preferable precoding matrix, and reports the matrix to the base station apparatus as PMI. Thus, the base station apparatus can recognize the preferable transmit beam direction for the terminal apparatus. Note that the codebook includes precoding (beamforming) matrices for combination of antenna ports and precoding (beamforming) matrices for selection from the antenna ports. In a case that a codebook for selection from the antenna ports is used, the base station apparatus can use different transmit beam directions for the respective antenna ports. Accordingly, in a case that the terminal apparatus reports an antenna port preferable as PMI, the base station apparatus can recognize the preferable transmit beam direction. Note that the preferable receive beam for the terminal apparatus may be a receive beam direction associated with the CRI or the preferable receive beam direction may be determined again. In a case that the codebook for selection from the antenna ports is used, a receive beam direction in which CSI-RS is received is desirably received in a receive beam direction associated with the CRI in a case that the preferable receive beam direction for the terminal apparatus is the receive beam direction associated with the CRI. Note that even in a case of using the receive beam direction associated with the CRI, the terminal apparatus can associate PMI with the receive beam direction. In a case that the codebook for selection from the antenna ports is used, the antenna ports may be transmitted from different base station apparatuses (cells). In this case, in a case that the terminal apparatus reports PMI, the base station apparatus can recognize which base station apparatus (cell) achieves preferable communication quality. Note that in this case, it can be assumed that the antenna ports of different base station apparatuses (cells) are not quasi co-located.

In addition to the serving cell, the terminal apparatus 4A can receive an interference signal (neighbor cell interference) from neighbor cells. The interference signal is PDSCH, PDCCH, or a reference signal in the neighbor cell. In this case, cancellation or suppression of the interference signal in the terminal apparatus is effective. As schemes for canceling or suppressing interference signal, Enhanced-Minimum Mean Square Error (E-MMSE) which estimates the channel of the interference signal and is suppressed by the linear weight, an interference canceler that generates an interference signal replica for cancellation, a Maximum Likelihood Detection (MLD) for detecting a desired signal, in which all of the desired signal and the interference signal transmit signal candidate are searched, a Reduced complexity-MLD (R-MLD) with a lower computation amount than the MLD by reducing transmit signal candidates, and the like can be applied. Application of these schemes requires channel estimation for the interference signal, demodulation of the interference signal, or decoding of the interference signal. Thus, in order to efficiently cancel or suppress the interference signal, the terminal apparatus needs to recognize parameters for the interference signal (neighbor cell). Thus, the base station apparatus can transmit (configure) assistance information including the parameters for the interference signal (neighbor cell) to the terminal apparatus to assist the terminal apparatus in canceling or suppressing the interference signal. One or multiple pieces of assistance information are configured. The assistance information includes, for example, some or all of a physical cell ID, a virtual cell ID, a power ratio (power offset) of the reference signal to PDSCH, a scrambling identity of the reference signal, quasi co-location (QCL) information, the CSI-RS resource configuration, the number of CSI-RS antenna ports, subcarrier spacings, resource allocation granularity, resource allocation information, a DMRS configuration, a DMRS antenna port number, the number of layers, a TDD DL/UL configuration, PMI, RI, a modulation scheme, and a Modulation and coding scheme (MCS). Note that the virtual cell ID is an ID virtually allocated to the cell and that cells may have the same physical cell ID and different virtual cell IDs. The QCL information is information related to QCL for a prescribed antenna port, a prescribed signal, or a prescribed channel. In a case that long term performance of a channel on which a symbol on an antenna port is carried can be estimated from a channel on which a symbol on another antenna port is carried, the two antenna ports are said to be quasi co-located (in a QCL state). The long term performance includes a delay spread, a Doppler spread, a Doppler shift, an average gain, an average delay, spatial reception parameters and/or spatial transmission parameters. In other words, in a case that two antenna ports are quasi co-located (in a QCL state), the terminal apparatus can consider the two antenna ports to have the same long term performance. The subcarrier spacing indicates the subcarrier spacing of the interference signal or candidates for a subcarrier spacing that may be used in the band. Note that, in a case that the subcarrier spacing included in the assistance information differs from a subcarrier spacing used in communication with a serving cell, the terminal apparatus need not cancel or suppress the interference signal. The candidates for the subcarrier spacing that may be used in the band may indicate commonly used subcarrier spacings. For example, the commonly used subcarrier spacings need not include a low-frequency subcarrier spacing as used for high reliability, low latency communication (emergency communication). The resource allocation granularity indicates the number of resource blocks for which precoding (beamforming) remains unchanged. The DMRS configuration indicates a PDSCH mapping type and additional mapping of DMRS. The DMRS resource allocation varies depending on the PDSCH mapping type. For example, in a PDSCH mapping type A, DMRS is mapped to the third symbol in a slot. For example, in a PDSCH mapping type B, DMRS is mapped to the first OFDM symbol in an allocated PDSCH resource. The additional mapping of DMRS indicates whether to additionally map DMRS or not or additional mapping. Note that some or all of the parameters included in the assistance information are transmitted (configured) through the higher layer signalling. Some or all of the parameters included in the assistance information are transmitted in the downlink control information. In a case that each of the parameters included in the assistance information indicates multiple candidates, the terminal apparatus blind-detects a preferable one of the candidates. Parameters not included in the assistance information are blind-detected by the terminal apparatus.

In a case that the terminal apparatus communicates using multiple receive beam directions, ambient interference conditions vary greatly depending on the receive beam direction. For example, an interference signal that is strong in one receive beam direction may be weaker in another receive beam direction. Not only may the assistance information for a cell that is unlikely to interfere significantly be meaningless, but may also lead to wasteful computations in a case that whether a strong interference signal is being received or not is determined. Accordingly, the assistance information is desirably configured for each receive beam direction. However, the base station apparatus does not necessarily recognize the reception direction for the terminal apparatus, and thus information related to the receive beam direction may be associated with the assistance information. For example, the terminal apparatus can associate the CRI with the receive beam direction, and thus the base station apparatus can transmit (configure) one or multiple pieces of assistance information for each piece of the CRI. The terminal apparatus can associate the time index of the synchronization signal block with the receive beam direction, and thus the base station apparatus can transmit (configure) one or multiple pieces of assistance information for each time index of the synchronization signal block. The terminal apparatus can associate PMI (antenna port number) with the receive beam direction, and thus the base station apparatus can transmit (configure) one or multiple pieces of assistance information for each PMI (antenna port number). In a case that the terminal apparatus includes multiple subarrays, the receive beam direction is likely to vary with subarray, and thus the base station apparatus can transmit (configure) one or multiple pieces of assistance information for each of the indexes associated with the subarrays of the terminal apparatus. In a case that multiple base station apparatuses (transmission and/or reception points) communicate with the terminal apparatus, the terminal apparatus is likely to communicate in a receive beam direction different from the receive beam direction for each base station apparatus (transmission and/or reception point). Thus, the base station apparatus transmits (configures) one or multiple pieces of assistance information for each information indicating the base station apparatus (transmission and/or reception point). Information indicating the base station apparatus (transmission and/or reception point) may be a physical cell ID or a virtual cell ID. In a case that the base station apparatus (transmission and/or reception point) uses a different DMRS antenna port number, information indicating the DMRS antenna port number or the DMRS antenna group is used as information indicating the base station apparatus (transmission and/or reception point).

Note that the number of pieces of assistance information configured by the base station apparatus for each piece of CRI may be common. Here, the number of pieces of assistance information refers to the type of assistance information, the number of elements of each piece of assistance information (e.g., the number of candidates for the cell ID), and the like. A maximum value is configured for the number of pieces of assistance information configured by the base station apparatus for each piece of CRI, and the base station apparatus can configure the assistance information for each piece of CRI such that the number of pieces of assistance information is equal to or smaller than the maximum value.

Note that, in a case that the receive beam direction of the terminal apparatus varies, the transmit antennas are unlikely to be quasi co-located. Accordingly, the assistance information can be associated with the QCL information. For example, in a case that the base station apparatus transmits (configures) assistance information related to multiple cells, the base station apparatus can indicate quasi-co-located cells (or non-quasi-co-located cells) to the terminal apparatus.

Note that the terminal apparatus cancels or suppresses the interference signal by using the assistance information associated with the CRI used for communication with the serving cell.

The base station apparatus may configure assistance information associated with the receive beam direction (CRI/time index of the synchronization signal block/PMI/antenna port number/subarray) and assistance information that is not associated with the receive beam direction (CRI/time index of the synchronization signal block/PMI/antenna port number/subarray). The assistance information associated with the receive beam direction and the assistance information not associated with the receive beam direction may be selectively used for the capability and category of the terminal apparatus. The capability and category of the terminal apparatus may indicate whether the terminal apparatus supports receive beamforming or not. The assistance information associated with the receive beam direction and the assistance information not associated with the receive beam direction may be selectively used in a frequency band. For example, the base station apparatus does not configure the assistance information associated with the receive beam direction at frequencies lower than 6 GHz. For example, the base station apparatus configures the assistance information associated with the receive beam direction only at frequencies higher than 6 GHz.

Note that the CRI may be associated with a CSI resource set configuration ID. In a case of indicating the CRI to the terminal apparatus, the base station apparatus may indicate the CRI along with the CSI resource set configuration ID. Note that in a case that the CSI resource set configuration ID is associated with one piece of CRI or one receive beam direction, the base station apparatus may configure the assistance information for each CSI resource set configuration ID.

The base station apparatus requests the terminal apparatus to perform neighbor cell measurements in order to recognize neighbor cells associated with the receive beam direction of the terminal apparatus. The neighbor cell measurement request includes information related to the receive beam direction of the terminal apparatus and a cell ID. In a case of receiving the neighbor cell measurement request, the terminal apparatus measures RSRP/RSRQ/RSSI of a neighbor cell, and reports to the base station apparatus the RSRP/RSRQ/RSSI of the neighbor cell together with information related to the receive beam direction of the terminal apparatus. Note that the information related to the receive beam direction of the terminal apparatus is information indicating the CRI, the time index of the synchronization signal block, the subarray of the terminal apparatus, or the base station apparatus (transmission and/or reception point).

In a case that the terminal apparatus moves, the surrounding environment may change from time to time. Accordingly, the terminal apparatus desirably observes surrounding channel conditions, interference conditions, and the like at a prescribed timing and report the conditions to the base station apparatus. Report results are reported by periodic reporting or event-based reporting. In a case of periodic reporting, the terminal apparatus periodically measures RSRP/RSRQ by using the synchronization signal or CSI-RS, and reports RSRP/RSRQ. In a case of event-based reporting, an event ID and a condition related to the report are associated. The event ID may be, for example, as follows, and a threshold required to calculate the condition (if necessary, a threshold 1 and a threshold 2), and an offset value are also configured. Event A1: in a case that a measurement result for the serving cell is better than the configured threshold. Event A2: in a case that the measurement result for the serving cell is worse than the configured threshold. Event A3: in a case that a measurement result for the neighbor cell is better than a measurement result for PCell/PSCell by a configured offset value or greater. Event A4: in a case that the measurement result for the neighbor cell is better than a configured threshold. Event A5: in a case that the measurement result for PCell/PSCell is worse than the configured threshold 1, and the measurement result for the neighbor cell is better than the configured threshold 2. Event A6: in a case that the measurement result for the neighbor cell is better than a measurement result for SCell by a configured offset value or greater. Event C1: in a case that a measurement result for the CSI-RS resource is better than a configured threshold. Event C2: in a case that the measurement result for the CSI-RS resource is better than a measurement result for a configured reference CSI-RS resource by an offset amount or greater. Event D1: in a case that a measurement result for a CSI-RS resource different from the CRI is better than a configured threshold. Event D2: in a case that a measurement result for a CSI-RS resource associated with the CRI is worse than the configured threshold. Event D3: in a case that a measurement result for a receive beam direction not associated with the CRI is better than a configured threshold. Event D4: in a case that a measurement result for an SS block index used for synchronization is worse than a configured threshold. Event D5: in a case that a measurement result for an SS block index not used for synchronization is worse than the configured threshold. Event E1: time elapsed since determination of a beam by the base station apparatus exceeds a threshold. Event E2: time elapsed since determination of a beam by the terminal apparatus exceeds a threshold.

In a case of performing reporting based on the report configuration, the terminal apparatus reports SS-RSRP/SS-RSRQ/CSI-RSRP/CSI-RSRQ/RS SI as measurement results.

Figure 5:
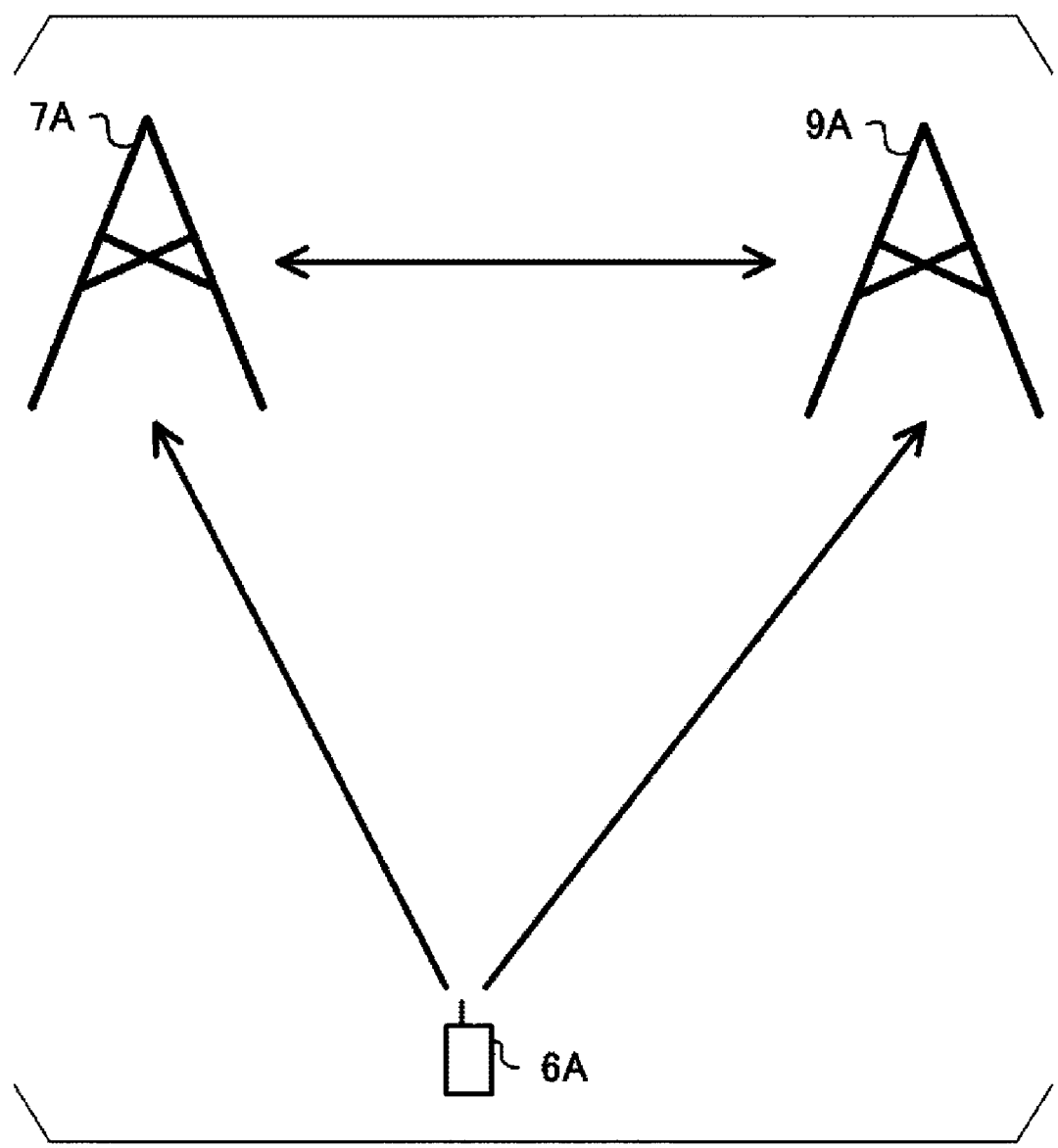
FIG. 5 is a diagram illustrating an example of a communication system according to the present embodiment.

FIG. 5 illustrates an example of an uplink communication system according to the present embodiment. The communication system illustrated in FIG. 5 includes a base station apparatus 7A, a base station apparatus 9A, and a terminal apparatus 6A. The terminal apparatus 6A can use the base station apparatus 7A and/or the base station apparatus 9A as a serving cell. In a case that the base station apparatus 7A or the base station apparatus 9A includes a large number of antennas, the multiple antennas can be divided into multiple subarrays (panels or sub-panels), and transmit/receive beamforming can be applied to each subarray. In this case, each subarray may include a communication apparatus, and the configuration of the communication apparatus is similar to the base station apparatus configuration illustrated in FIG. 2, unless otherwise indicated. In a case that the terminal apparatus 6A includes multiple antennas, the terminal apparatus 6A can perform transmission or reception by beamforming. In a case that the terminal apparatus 6A includes a multiple antennas, the large number of antennas can be divided into multiple subarrays (panels or sub-panels), and different transmit/receive beamforming can be applied to each subarray. Each subarray can include a communication apparatus, and the configuration of the communication apparatus is similar to the terminal apparatus configuration illustrated in FIG. 3, unless otherwise indicated. Note that the base station apparatus 7A and the base station apparatus 9A are also simply referred to as base station apparatuses. Note that the terminal apparatus 6A is also simply referred to as a terminal apparatus.

In the uplink, the SRS is used to determine a preferable transmit beam for the terminal apparatus and a preferable receive beam for the base station apparatus. The base station apparatus can transmit (configure), through the higher layer signalling, configuration information related to the SRS. The configuration information includes one or multiple SRS resource set configurations. The SRS resource set configuration includes an SRS resource set configuration ID and/or one or multiple SRS resource configurations. The SRS resource set configuration ID is used to identify the SRS resource set configuration. The SRS resource configuration includes an SRS resource configuration ID, the number of SRS antenna ports, an SRS transmission comb (Comb), SRS resource mapping, SRS frequency hopping, and an SRS resource configuration type. The SRS resource configuration ID is used to identify the SRS resource configuration. The SRS transmission comb indicates frequency intervals in a comb-shaped spectrum and positions (offsets) within the frequency intervals. The SRS resource mapping indicates the position of an OFDM symbol in a slot at which the SRS is mapped and the number of OFDM symbols. The SRS frequency hopping is information indicating frequency hopping of the SRS. The SRS resource configuration type indicates operation of the SRS resource configuration in the time domain. Specifically, the SRS resource configuration type indicates whether the SRS resource configuration is for aperiodic transmission of the SRS, for periodic transmission of the SRS, or for semi-persistent transmission of the SRS.

In a case that multiple SRS resources are configured for the terminal apparatus, the base station apparatus can determine a preferable SRS resource by performing transmission in different transmit beam directions on the respective SRS resources. In a case that the base station apparatus transmits (indicates), to the terminal apparatus, an SRS Resource Indicator (SRI) that is information indicating the SRS resource for the base station apparatus, the terminal apparatus can recognize that the transmit beam direction for transmission on the SRS resource is preferable. Note that the base station apparatus may request the terminal apparatus to use the same transmit beam for transmission for a prescribed period of time in order to obtain a preferable receive beam for the base station apparatus. In accordance with the request from the base station apparatus, the terminal apparatus uses an indicated SRS resource to perform transmission in the same transmit beam direction as that for information transmitted in indicated SRI, during an indicated period of time.

In a case of including multiple subarrays, the terminal apparatus can communicate with multiple base station apparatuses (transmission and/or reception points). In the example illustrated in FIG. 5, the terminal apparatus 6A can use the base station apparatus 7A and the base station apparatus 9A as serving cells. In this case, for the terminal apparatus 6A, the transmit beam direction preferable for communication with the base station apparatus 7A is likely to differ from the transmit beam direction preferable for communication with the base station apparatus 9A. Accordingly, by using different subarrays to perform transmission in different transmit beam directions, the terminal apparatus 6A can communicate with the base station apparatus 7A and the base station apparatus 9A at the same timing.

In a case that the terminal apparatus transmits the SRS on the multiple antenna ports in one SRS resource, different transmit beam directions can be used for each antenna port. In this case, in a case that the base station apparatus indicates, to the terminal apparatus, transmission with a preferable antenna port number, the terminal apparatus can recognize a preferable transmit beam direction. Note that the base station apparatus can also indicate transmit PMI (TPMI) to the terminal apparatus by using a codebook from which an antenna port is selected. The base station apparatus can indicate, to the terminal apparatus, which codebook is to be referenced. With reference to the indicated codebook, the terminal apparatus can use the transmit beam direction corresponding to the antenna port number indicated by the TPMI.

In a case of including multiple subarrays and being capable of using the multiple subarrays for transmission at the same timing, the terminal apparatus can apply different antenna port numbers among subarrays. At this time, in a case that the terminal apparatus transmits the SRS by using transmit beams from antenna ports in different subarrays and receives TPMI from the base station apparatus, the terminal apparatus can recognize the preferable subarray and transmit beam direction. Accordingly, the terminal apparatus can associate TPMI with the subarray and the transmit beam direction.

Note that, in a case of communicating with multiple base station apparatuses (transmission and/or reception points), the terminal apparatus can transmit the same signal (data) or different signals (data) to the base station apparatuses (transmission and/or reception points). In a case that the terminal apparatus uses the same signal (data) to communicate with multiple base station apparatuses (transmission and/or reception points), the signals received at the multiple base station apparatuses (transmission and/or reception points) can be combined together to improve reception quality, and thus multiple base station apparatuses (transmission and/or reception points) desirably coordinate with one another in executing reception processing.

The base station apparatus may use DCI for scheduling of PUSCH. In a case that the terminal apparatus communicates with multiple base station apparatuses, each base station apparatus can transmit the DCI for scheduling of PUSCH. The DCI includes SRI and/or TPMI, and the terminal apparatus can recognize a transmit beam preferable for the base station apparatus. In a case that the terminal apparatus communicates with the multiple base station apparatuses, the DCI from one base station apparatus can be used to transmit PUSCH to the multiple base station apparatuses. For example, in a case that the DCI includes control information for multiple layers (codewords or transport blocks) indicating (configuring) the SRI and/or TPMI to each layer, each layer is transmitted by a transmit beam preferable for each base station apparatus. In this way, in a case of receiving one piece of DCI, the terminal apparatus can transmit different signals (data) to the multiple base station apparatuses. In a case that the DCI includes control information for one layer and multiple pieces of SRI and/or TPMI are indicated (configured) to one layer, the terminal apparatus transmits one layer (the same data) by using different transmit beams. In this way, in a case of receiving one piece of DCI, the terminal apparatus can transmit the same signal (data) to the multiple base station apparatuses.

In a case that the terminal apparatus performs transmission to the multiple base station apparatuses at the same timing, each base station apparatus desirably recognizes the quality of communication with the terminal apparatus at the same timing. Thus, the base station apparatus can indicate (trigger) SRS resources corresponding to multiple pieces of SRI and each piece of SRI by using one piece of DCI. In other words, in a case that the terminal apparatus transmits the SRS in the transmit beam direction corresponding to each piece of SRI at the same timing, each of the base station apparatuses can recognize the quality of communication with the terminal apparatus at the same timing.

In a case that the subarrays included in the terminal apparatus use only one transmit beam direction at the same timing, the different subarrays are used for transmission to the multiple base station apparatuses at the same timing. At this time, in a case that the base station apparatus uses one piece of DCI to indicate (configure) two pieces of SRI, the terminal apparatus may not be able to perform transmission corresponding to two pieces of SRI at the same timing in a case that two pieces of SRI are associated with the same subarray. To avoid this problem, for example, the base station apparatus can configure multiple SRS resources into groups, and request the terminal apparatus to transmit the SRS by using the same subarray within the group. In a case that different subarrays are used for the groups, the base station apparatus can recognize multiple pieces of SRI that can be configured with the same timing. Note that the SRS resource group may be an SRS resource set. Note that the SRSs (SRS resources) that can be configured with the same timing may be non-quasi-co-located. At this time, the terminal apparatus can transmit the SRS in association with the QCL information. For example, in a case that the terminal apparatus distinguishes a quasi-co-located SRS from a non-quasi-co-located SRS for transmission, the base station apparatus may configure non-quasi-co-located SRI with the same timing while not configuring quasi-co-located SRI with the same timing. The base station apparatus may request the SRS for each subarray of the terminal apparatus. In this case, the terminal apparatus transmits the SRS for each subarray.

Note that in a case that the base station apparatus has indicated to the terminal apparatus two pieces of SRI prevented from being transmitted at the same timing, the terminal apparatus can request the base station apparatus to execute a procedure for beam recovery in which transmit beam selection is performed again. The beam recovery procedure is a procedure performed in a case that tracking of the transmit and/or receive beam is lost between the terminal apparatus and the base station apparatus, leading to significantly reduced communication quality. The terminal apparatus needs to acquire a new connection destination (transmit beam for the base station apparatus) in advance. The terminal apparatus according to the present embodiment has acquired the transmit beam itself, but a procedure of beam recovery can be used to release a configured state of two pieces of SRI that fail to be transmitted at the same timing.

The terminal apparatus according to the present embodiment can include multiple antennas (antenna panels) each configured with independent beamforming. The terminal apparatus according to the present embodiment can use multiple antenna panels. Of course, the terminal apparatus can switch among the multiple antenna panels for use, but in a case that inappropriate selection of the antenna panels significantly reduces transmission quality particularly in high frequency transmission. Thus, the terminal apparatus can perform beam scanning (searching) with the base station apparatus to select beamforming configured for the antenna. The terminal apparatus according to the present embodiment can transmit the SRS in order to perform the beam scanning.

The base station apparatus according to the present embodiment can notify the terminal apparatus of information indicating duality (relationship, reciprocity) related to downlink and uplink propagation (channel) performance. As information related to the propagation performance, the base station apparatus can notify the terminal apparatus of information indicating beam correspondence (spatial relation, spatial relation information, and reception parameters). Here, the beam correspondence includes information indicating relation between reception beamforming (a spatial domain reception filter, a reception weight, a reception parameter, and a reception spatial parameter) used by the terminal apparatus in receiving a downlink signal and transmission beamforming (a spatial domain transmission filter, a transmission weight, a transmission parameter, and a transmission spatial parameter) used in transmitting the uplink signal.

The base station apparatus can configure the beam correspondence for each signal transmitted by the terminal apparatus. For example, the base station apparatus can notify the terminal apparatus of information indicating the beam correspondence for an SRS transmitted by the terminal apparatus. The base station apparatus can notify the terminal apparatus of SRS spatial relation information (SRS-SpatialRelationInfo). In a case that the SRS spatial relation information indicates a prescribed signal (value or condition), the terminal apparatus can perform SRS transmission using beamforming associated with the prescribed signal. For example, in a case that the SRS spatial relation information specifies a synchronization signal (SSB and PBCH), the terminal apparatus can transmit the SRS using the receive beamforming used in a case of receiving the synchronization signal. Similarly, the base station apparatus can notify spatial relation information related to other signals transmitted by the terminal apparatus (e.g., PUCCH/PUSCH/RS/RACH) or other signals received by the terminal apparatus (e.g., PDCCH/PDSCH/RS). In other words, the base station apparatus can notify the terminal apparatus of spatial relation information related to a first signal and a second signal. In a case that the terminal apparatus receives the spatial relation information related to the first signal and the second signal and the spatial relation information recognizes that the spatial relation is guaranteed between the first signal and the second signal, the terminal apparatus can use the reception parameter with which the first signal has been received (or the transmission parameter with which the first signal has been transmitted) to transmit the second signal (or receive the second signal).

The base station apparatus according to the present embodiment can configure spatial relation information between frequencies. For example, in a case that the base station apparatus configures a Pcell (first component carrier) and a Scell (second component carrier) with respect to the terminal apparatus, the base station apparatus can configure the spatial relation between a Pcell signal and a Scell signal. The base station apparatus can notify the terminal apparatus of information indicating whether the spatial relation with the signal received on the Pcell is guaranteed for the SRS transmitted on the Scell by the terminal apparatus or not. For example, the base station apparatus can configure the "Pcell SSB/PBCH" for the terminal apparatus as SRS spatial relation information related to the Scell. In this case, the terminal apparatus can configure beamforming used in a case of receiving the synchronization signal at the Pcell to the SRS transmitted in the Scell. For example, the base station apparatus can configure the "Pcell CSI-RS" for the terminal apparatus as the PUCCH/PUSCH spatial relation information related to the Scell. In this case, the terminal apparatus can configure beamforming used in receiving the CSI-RS on the Pcell (or beamforming configured in calculating the CRI fed back on the Pcell), for transmission of the PUCCH/PUSCH on the Scell.

Note that the method in which the base station apparatus specifies spatial relation information related to the Scell is not limited to the above-described expression. The base station apparatus can specify the spatial relation information related to the Scell in a manner that allows the terminal apparatus to identify a component carrier (or Bandwidth part (BWP)) in which a signal (for example, a synchronization signal (SSB/PBCH), a CSI-RS, or an SRS) specified in the spatial relation information configured for the Scell has been transmitted. Thus, in a case of indicating spatial relation information related to the Scell, the base station apparatus can specify the signal, while also specifying information associated with the signal (e.g., BWP configuration or CC_Info).

Note that the terminal apparatus does not assume that the base station apparatus indicates the transmission of the SRS to the terminal apparatus in the component carrier not configured with the PUSCH/PUCCH. However, even for the Scell in which the terminal apparatus does not assume to transmit the SRS, the base station apparatus according to the present embodiment can notify the terminal apparatus of information associated with the beam correspondence in the Scell. This indication enables the terminal apparatus to configure, even in the Scell for which the PUSCH/PUCCH is not indicated, the received beam for the Scell by, for example, obtaining information associated with the beam correspondence specifying the Pcell signal.

In a case that the spatial relation between the Pcell and the Scell is configured for the terminal apparatus, the base station apparatus can individually configure the respective signals, as described above, and can, on the other hand, comprehensively configure the signals. For example, the base station apparatus can configure the spatial relation between the Pcell and the Scell for the terminal apparatus. For example, the base station apparatus can notify the terminal apparatus of information indicating that a spatial relation is guaranteed for the Pcell, as spatial relation information related to the Scell. The base station apparatus defines the Scell spatial relation information, and configures the "Pcell" or the cell ID of the Pcell as Scell spatial relation information. This allows the terminal apparatus to make, about the spatial relation configured in the Pcell, the same assumption as that about the spatial relation for the Scell signal.

The base station apparatus can notify the terminal apparatus of information indicating that the spatial relation for the Scell is the same as the spatial relation for the Pcell. For example, in a case of indicating to the terminal apparatus that, in the Pcell, the SRS spatial relation is guaranteed for the CSI-RS, the base station apparatus can notify the terminal apparatus of information indicating that the configuration of spatial relation for the Scell may be assumed to be the same as the spatial relation for the Pcell in order to notify the terminal apparatus that, also in the Scell, the SRS spatial relation of the terminal apparatus is guaranteed for the CSI-RS.

In a case of configuring multiple Scells for the terminal apparatus, the base station apparatus can configure, for the terminal apparatus, the beam correspondence for the multiple Scells. For example, instead of configuring, for the terminal apparatus, the beam correspondence for each of the multiple Scells, the base station apparatus can notify the terminal apparatus that the beam correspondences assumed in the respective Scells by the terminal apparatus are the same as the beam correspondence assumed in the Pcell. Of course, the base station apparatus can notify the terminal apparatus of information indicating the Scell about which the same assumption as that about the beam correspondence assumed in the Pcell may be made.

In the beam correspondence relation between the Pcell and the Scell, the base station apparatus can configure a Default configuration or a default state for the terminal apparatus. The base station apparatus can configure for the terminal apparatus, as a default configuration, the beam correspondence for the Scell being the same as the beam correspondence for the Pcell. In this case, in a case that the base station apparatus does not perform any other configuration, the terminal apparatus can communicate in the Scell on the assumption that the beam correspondence for the Scell is the same as the beam correspondence configured in the Pcell.

The base station apparatus according to the present embodiment can configure spatial relation information for the Bandwidth part (BWP). The base station apparatus according to the present embodiment can configure one or multiple BWPs within one component carrier. The base station apparatus can notify the terminal apparatus of information indicating a spatial relation between a prescribed signal in a first BWP and a prescribed signal in a second BWP. For example, the base station apparatus can notify the terminal apparatus that the same spatial relation can be assumed between BWPs within one component carrier. In this case, even in a case that the BWP in which communication is performed is changed or the bandwidth of the BWP is changed, the terminal apparatus can communicate assuming a spatial relation configured for the component carrier to which the BWP belongs.

In a case that TDD (time division duplex) is used as a duplex scheme for the component carrier for which the base station apparatus configures the Pcell and the Scell, the base station apparatus can configure, for each of the Pcell and the Scell, the "downlink (D)", "uplink (U)", and "Flexible (X)" configured for each slot in the Pcell and the Scell.

The base station apparatus according to the present embodiment can associate the configuration in each slot with the spatial relation information. The base station apparatus can associate the slot configuration of the Pcell and the Scell with the spatial relation information. For example, the base station apparatus can configure the spatial relation information in a case that the slot of the Pcell and the Scell is in a prescribed relationship. In a case that the slot configuration of the Pcell (first slot configuration) is 'D' and the slot configuration of the Scell (second slot configuration) is 'S,' the base station apparatus can configure, for the terminal apparatus, the Scell and the Pcell having the same spatial relation. In this case, the terminal apparatus can receive the downlink signal of the Pcell and transmit the uplink signal of the Scell using the same beamforming. In other words, in a case that the terminal apparatus according to the present embodiment fails to configure the same spatial relation for the Pcell and for the Scell, this suggests that different slots are not configured for the Pcell and for the Scell. In a case that different slots are configured for the Pcell and for the Scell, the terminal apparatus can perform transmission and reception processing on the assumption that the same spatial relation can be configured for the Pcell and for the Scell.

In a case that the slot configuration of the Pcell matches the slot configuration of the Scell, the base station apparatus can configure, for the terminal apparatus, the same spatial relation for the Pcell and for the Scell. In a case that the slot configuration of the Pcell matches the slot configuration of the Scell, the terminal apparatus can perform transmission and reception processing on the assumption that the same spatial relation can be configured. Of course, the spatial relation for all the signals can be assumed to be the same for the Pcell and for the Scell. However, the base station apparatus can configure different spatial relations for the individual signals.

Note that no limitation is intended for the method in which the base station apparatus notifies the terminal apparatus of information indicating the spatial relation as described above. For example, the base station apparatus can semi-statically configure the spatial relation for the terminal apparatus by using higher layer signaling (RRC signaling), and can dynamically configure the spatial relation for the terminal apparatus by using DCI.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be preferably used in a base station apparatus, a terminal apparatus, and a communication method. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1A, 3A, 5A, 7A, 9A Base station apparatus
2A, 4A, 6A Terminal apparatus
101 Higher layer processing unit
102 Controller
103 Transmitter
104 Receiver
105 Transmit and/or receive antenna
106 Measuring unit
1011 Radio resource control unit
1012 Scheduling unit
1031 Coding unit
1032 Modulation unit
1033 Downlink reference signal generation unit
1034 Multiplexing unit
1035 Radio transmitting unit
1041 Radio receiving unit
1042 Demultiplexing unit
1043 Demodulation unit
1044 Decoding unit
201 Higher layer processing unit
202 Controller
203 Transmitter
204 Receiver
205 Measuring unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmitting unit
2041 Radio receiving unit
2042 Demultiplexing unit
2043 Signal detection unit

The invention claimed is:
1. A terminal apparatus configured to communicate with a base station apparatus by using a first cell and a second cell, the terminal apparatus comprising:
reception circuitry configured to receive a downlink signal in the first cell; and
transmission circuitry configured to transmit an uplink signal in the first cell, wherein:
the reception circuitry is further configured to receive spatial relation information for the uplink signal in the first cell, the spatial relation information indicat- ing a spatial domain transmission filter used for transmitting the uplink signal, and the spatial relation information includes a cell identifier indicating the second cell.

2. The terminal apparatus according to claim 1, wherein the spatial relation information in the first cell further includes information indicating a bandwidth part for the second cell.

3. A base station apparatus configured to communicate with a terminal apparatus by using a first cell and a second cell, the base station apparatus comprising:

transmission circuitry configured to transmit a downlink signal in the first cell; and reception circuitry configured to receive an uplink signal in the first cell, wherein:

the transmission circuitry is further configured to transmit spatial relation information for the uplink signal in the first cell, the spatial relation information indicating a spatial domain transmission filter used for transmitting the uplink signal, and the spatial relation information includes a cell identifier indicating the second cell.

4. The base station apparatus according to claim 3, wherein the spatial relation information in the first cell further includes information indicating a bandwidth part for the second cell.

5. A communication method for a terminal apparatus configured to communicate with a base station apparatus by using a first cell and a second cell, the communication method comprising:

receiving a downlink signal in the first cell;

transmitting an uplink signal in the first cell; and receiving spatial relation information for the uplink signal in the first cell, the spatial relation information indicating a spatial domain transmission filter used for transmitting the uplink signal, wherein the spatial relation information includes a cell identifier indicating the second cell.

6. A communication method for a base station apparatus configured to communicate with a terminal apparatus by using a first cell and a second cell, the communication method comprising:

transmitting a downlink signal in the first cell;

receiving an uplink signal in the first cell; and transmitting spatial relation information for the uplink signal in the first cell, the spatial relation information indicating a spatial domain transmission filter used for transmitting the uplink signal, wherein the spatial relation information includes a cell identifier indicating the second cell.

\* \* \* \* \*